United States Patent
Gao et al.

(10) Patent No.: US 10,541,579 B2
(45) Date of Patent: Jan. 21, 2020

(54) WIND POWER GENERATOR AND STATOR IRON CORE THEROF, AND STATOR IRON CORE MODULE

(71) Applicant: XINJIANG GOLDWIND SCIENCE & TECHNOLOGY CO., LTD., Urumqi, Xinjiang (CN)

(72) Inventors: Yazhou Gao, Xinjiang (CN); Jing Xia, Xinjiang (CN); Xiang Zhao, Xinjiang (CN)

(73) Assignee: XINJIANG GOLDWIND SCIENCE & TECHNOLOGY CO., LTD., Urumqui, Xinjiang (CN)

(*) Notice: Subject to any disclaimer, the term of this patent is extended or adjusted under 35 U.S.C. 154(b) by 266 days.

(21) Appl. No.: 15/546,572

(22) PCT Filed: Nov. 17, 2015

(86) PCT No.: PCT/CN2015/094822
§ 371 (c)(1),
(2) Date: Jul. 26, 2017

(87) PCT Pub. No.: WO2016/119512
PCT Pub. Date: Aug. 4, 2016

(65) Prior Publication Data
US 2018/0019632 A1    Jan. 18, 2018

(30) Foreign Application Priority Data
Jan. 30, 2015   (CN) .......................... 2015 1 0052420

(51) Int. Cl.
*H02K 1/00*   (2006.01)
*H02K 3/28*   (2006.01)
(Continued)

(52) U.S. Cl.
CPC ............... *H02K 3/28* (2013.01); *H02K 1/165* (2013.01); *H02K 1/278* (2013.01); *H02K 3/12* (2013.01);
(Continued)

(58) Field of Classification Search
CPC ............ H02K 3/28; H02K 1/16; H02K 1/165; H02K 3/12; H02K 7/183; H02P 25/22; Y02E 10/725
(Continued)

(56) References Cited

U.S. PATENT DOCUMENTS 2,488,771 A * 11/1949 Glass, Jr. ................. H02K 3/12
                                                                    310/179
6,424,073 B1 * 7/2002 Kometani ................ H02K 1/16
                                                                    310/179
(Continued)

FOREIGN PATENT DOCUMENTS

CN          2646942 Y     10/2004
CN        102195370 A      9/2011
(Continued)

OTHER PUBLICATIONS

The First Chinese Office Action dated Aug. 26, 2016; Appln. No. 201510052420.9.
(Continued)

*Primary Examiner* — Thanh Lam

(57) ABSTRACT

A wind power generator and stator iron core thereof, and stator iron core module; the iron core module (4) has an overall dimension consistent with a principle of the number of slots per pole per phase q=1; the iron core module (4) is provided with two three-phase winding units therein, an electrical angle formed by the two three-phase winding units is 30 degrees. The method of arranging winding in the stator
(Continued)

iron core module (4) is changed to effectively reduce fifth and seventh winding harmonic magnetomotive forces.

17 Claims, 3 Drawing Sheets

(51) Int. Cl.
    *H02K 3/12*     (2006.01)
    *H02K 1/16*     (2006.01)
    *H02K 1/27*     (2006.01)
    *H02K 7/18*     (2006.01)

(52) U.S. Cl.
    CPC ......... *H02K 7/183* (2013.01); *H02K 2201/06* (2013.01)

(58) Field of Classification Search
    USPC .................................. 310/198, 179–180, 184
    See application file for complete search history.

(56) References Cited

U.S. PATENT DOCUMENTS

| | | |
|---|---|---|
| 2008/0116770 A1 | 5/2008 | Lewis |
| 2009/0218904 A1 | 9/2009 | Vollmer |
| 2009/0230806 A1* | 9/2009 | Miyata .................. H02K 3/28 310/195 |
| 2012/0038168 A1 | 2/2012 | Morishita et al. |
| 2012/0175994 A1* | 7/2012 | Flynn .................. H02K 1/148 310/216.106 |
| 2013/0088116 A1 | 4/2013 | Chin et al. |
| 2014/0091673 A1* | 4/2014 | Anbarasu ................. H02K 3/28 310/216.109 |
| 2015/0357892 A1 | 12/2015 | Nakano et al. |

FOREIGN PATENT DOCUMENTS

| | | |
|---|---|---|
| CN | 202218077 U | 5/2012 |
| CN | 102868246 A | 1/2013 |
| CN | 104617689 A | 5/2015 |
| CN | 204349605 U | 5/2015 |
| EP | 1808958 A2 | 7/2007 |
| JP | 2010-154672 A | 7/2010 |
| JP | 2012-130151 A | 7/2012 |
| JP | 2012-249386 A | 12/2012 |
| KR | 20120014863 A | 2/2012 |
| WO | 2011/127960 A1 | 10/2011 |
| WO | 2012/017303 A2 | 2/2012 |
| WO | 2014174572 A1 | 10/2014 |

OTHER PUBLICATIONS

Korean Office Action dated Sep. 6, 2016; Appln. No. 10-2015-0092218.

International Search Report dated Jan. 29, 2016; PCT/CN2015/094822.

Nicola Bianchi, et al; "Design Techniques for Reducing the Cogging Torque in Surfacer-Mounted PM Motors", IEEE Transactions on Industry Applications, vol. 38, No. 5, Sep./Oct. 2002, pp. 1259-1265.

The Extended European Search Report dated Sep. 3, 2018; Appln. No. 15879710.

\* cited by examiner

WIND POWER GENERATOR AND STATOR IRON CORE THEROF, AND STATOR IRON CORE MODULE

CROSS-REFERENCE TO RELATED APPLICATIONS

This application is the national phase of International Application No. PCT/CN2015/094822, titled "WIND POWER GENERATOR AND STATOR IRON CORE THEREOF, AND STATOR IRON CORE MODULE", filed on Nov. 17, 2015 which claims the benefit of priority to Chinese patent application No, 201510052420.9 titled "WIND POWER GENERATOR AND STATOR IRON CORE THEREOF, AND STATOR IRON CORE MODULE", filed with the Chinese State Intellectual Property Office on Jan. 30, 2015, the entire disclosures of which applications are incorporated herein by reference.

FIELD

The present application relates to a wind power generator and a stator iron core thereof and an iron core module of a stator, which pertains to the field of wind power generation technology.

BACKGROUND

With the increase of capacity of a large permanent magnet generator, the volume and dimension of the generator also increases accordingly, which results in an increase of manufacturing cost and transportation cost of a stator of the generator. The splitting technology for a stator iron core can well address the issue of the increase of manufacturing cost and transportation cost caused by the increase of the dimension of the stator. The stator iron core can be split in a single-layer winding structure. However, since the single-layer winding adopts the integral pitch design, it is unable to effectively reduce the content of fifth and seventh harmonic magnetic fields, which results in great torque ripple and causes vibration and noise of the generator to exceed the standards.

Therefore, in view of the issue that the stator iron core of the current large permanent magnet generator is required to be split, it is very necessary to develop a permanent magnet generator with a high-quality single-layer winding structure, which has small fifth and seventh harmonic contents, and a small torque ripple.

SUMMARY

A wind power generator, a stator iron core and an iron core module of a stator are provided according to the embodiments of the present application, the stator adopts a single-layer winding structure having small fifth and seventh harmonic contents, thereby reducing vibration and noise of the generator and extending the service life of the generator.

An iron core module of a stator of a wind power generator is provided according to the present application, the iron core module has an overall dimension conforming to a principle that the number q of slots per pole per phase is one, two three-phase winding units are provided in the iron core module, and an electrical angle difference between the two three-phase winding units is equal to 30 degrees.

A stator iron core of a wind power generator is further provided according to the present application. The stator iron core has a split structure and is formed by combining multiple iron core modules as described above.

A wind power generator is further provided according to the present application, which includes a rotor and a stator, and the stator includes the stator iron core as described above.

With the wind power generator, the stator iron core thereof and the iron core module of the stator according to the embodiments of the present application, the electrical angle difference between the two three-phase winding units is equal to 30 degrees by changing arrangement of windings in the iron core module of the stator, so as to effectively reduce the fifth and seventh winding harmonic magnetomotive forces, reduce torque ripple under no-load and load of the generator and improve back electromotive force wave under no-load, thereby reducing the vibration and noise of the generator, extending the service life of the generator and improving the reliability of the generator.

REFERENCE NUMERALS

| 1  | rotor support,    | 2, 3 | magnetic pole,    |
|----|-------------------|------|-------------------|
| 4  | iron core module, | 41   | first tooth slot, |
| 42 | second tooth slot,| 5-10 | winding coil.     |

DETAILED DESCRIPTION

Figure 1:
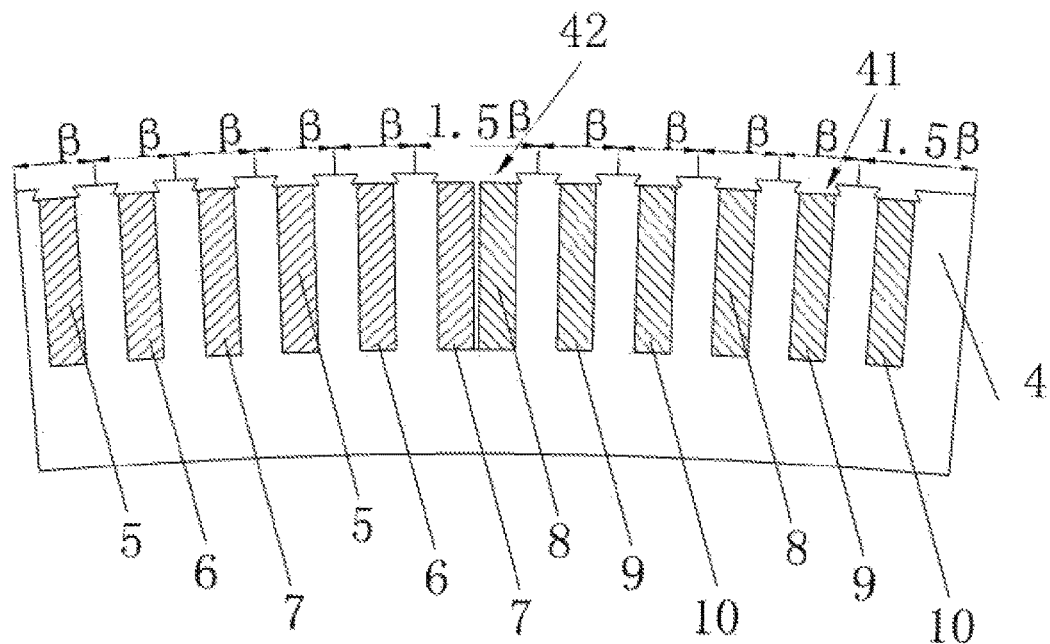
FIG. 1 is a schematic view showing the structure of an iron core module of a stator according to a first embodiment of the present application.

The embodiments of the present application are described in detail hereinafter with reference to the drawings.
First Embodiment As shown in FIG. 1, which shows an iron core of a stator in a wind power generator set according to an embodiment of the present application, the iron core module has an overall dimension consistent with a principle that the number q of slot per pole per phase is one. The iron core module is provided with two three-phase winding units therein, and an electrical angle between the two three-phase winding units is equal to 30 degrees.

Further, the iron core module 4 may have multiple tooth slots for accommodating coils, and each of the coils can be sleeved in two tooth slots. The tooth slots may include first tooth slots 41 each being configured to accommodate one coil side and a second tooth slot 42 configured to accommodate two coil sides. The number of the second tooth slot 42 can be one and the second tooth slot 42 is arranged in a middle position of the tooth slots, and the number of the first tooth slots 41 on a left side of the second tooth slot 42 may be equal to the number of the first tooth slots 41 on a right side of the second tooth slot 42. Two three-phase winding units having the same number of coils can be provided in the iron core module 4, the number of coils in each of the three-phase winding units can be an integer multiple of 3 (specifically, each three-phase winding unit is regarded as a set of three-phase winding, each phase winding can include a plurality of coils, but each three-phase winding contains the same number of coils, therefore, the total number of coils should be an integer multiple of 3). The two three-phase winding units can be provided on the left side and the right side of the second tooth slot 42 as the center, and one coil side of each of adjacent coils of the two three-phase winding units can be arranged in the second tooth slot 42.

Figure 2:
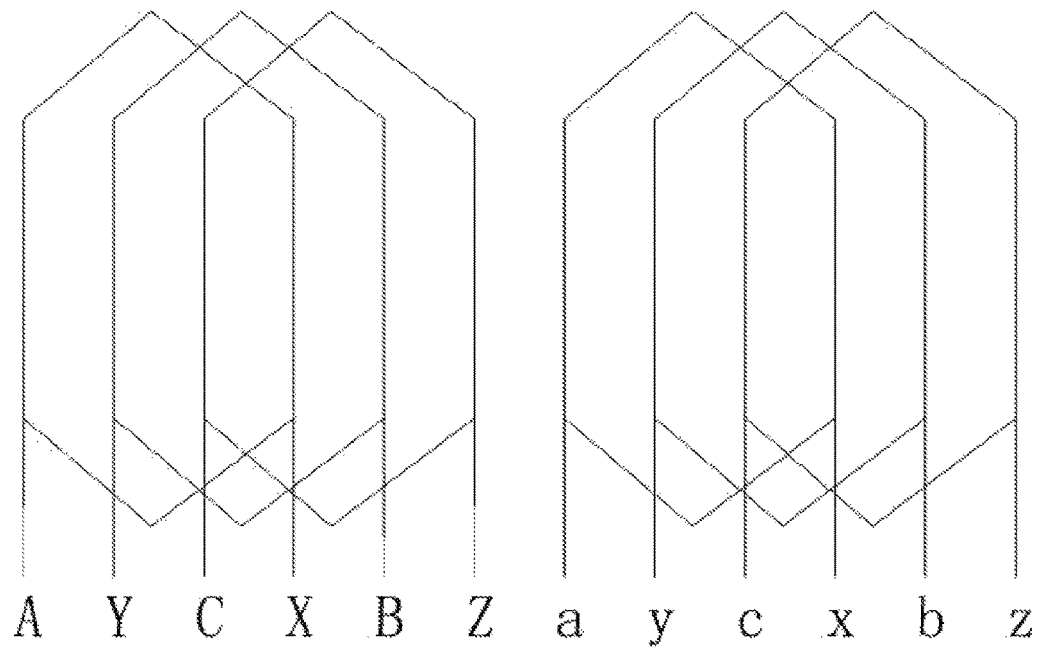
FIG. 2 is a first schematic view showing a connection relationship of coils in the iron core module shown in FIG. 1.
Figure 3:
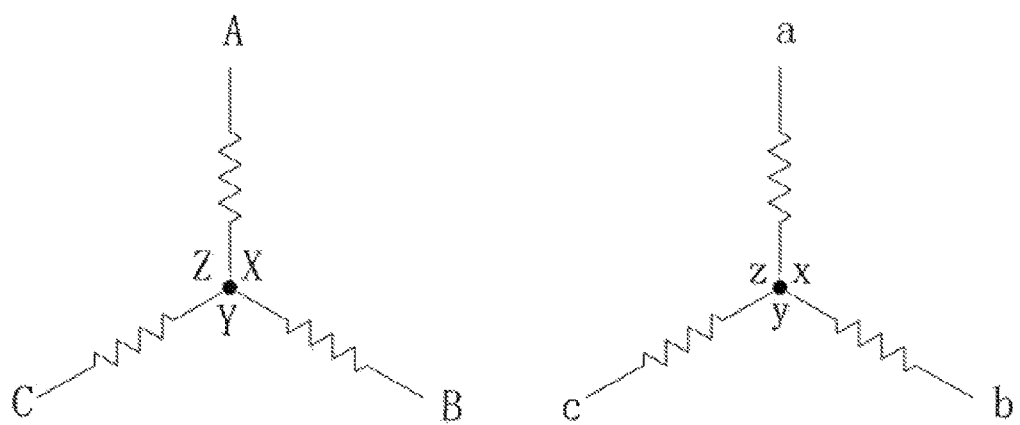
FIG. 3 is a second schematic view showing a connection relationship of coils in the iron core module shown in FIG. 1.

The iron core module of the stator according to the embodiment of the present application will be described in detail with reference to FIG. 1 to FIG. 3. In the iron core module 4 shown schematically in FIG. 1, the number of coils is six, and three coils are arranged on the left side and three coils are arranged on the right side, respectively. The six coils are respectively marked with the numbers of 5 to 7 and 8 to 10. The coils 5 to 7 form a set of three-phases winding unit, and the coils 8 to 10 form another set of three-phase winding unit. A span of each of the six coils is three (i.e., two coil sides of the coil are arranged to cross three tooth slots). As shown in FIG. 2, lead wires of the coils 5 to 7 sleeved in the tooth slots on the left side are denoted as A, Y, C, X, B, Z, and lead wires of the coils 8 to 10 sleeved in the tooth slots on the right side are denoted as a, y, c, x, b, z. By configuring and connecting these lead terminals, the coils can be configured as two three-phase winding units (six-phase windings in total) in star connection as shown in FIG. 3. Preferably, both the two three-phase winding units are in star connection.

In FIG. 1, the total number of the tooth slots is eleven, wherein the number of the first tooth slots 41 is ten, with five tooth slots being arranged on the left side and five tooth slots being arranged on the right side respectively, and the number of the second tooth slot 42 is one. The coil is substantially in an elliptical shape, and one coil side and the other coil side of each coil are respectively sleeved in two tooth slots, between which there are two tooth slots arranged, that is, one coil side of the coil 5 in FIG. 1 is arranged in a first tooth slot on the left side, and the other coil side of the coil 5 is arranged in a fourth tooth slot on the left side. One coil side of the coil 7 of the three-phase winding unit on the left side and one coil side of the coil 8 of the three-phase winding unit on the right side are arranged in the second tooth slot 42. With such an arrangement, an electrical angle difference of 30 degrees is formed between the left winding and the right winding (i.e., a phase difference between currents of the two windings is 30 degrees), thus effectively suppressing the fifth and seventh harmonic magnetic fields.

The iron core module 4 described above is a part of the iron core, and an entire stator iron core is formed after a certain number of the iron core modules 4 according to the embodiment are assembled. Each iron core module 4 is in a shape of an arc as a whole. According to the standard design principle that the number q of slot per pole per phase is one, in the iron core modules of the same iron core, the tooth slots have the same dimension and are arranged uniformly, included angles between centers of the adjacent teeth are the same and are defined as a standard included angle β (the included angle here is obtained taking the center of the stator as a center of circle). On the premise of the standard design, an alternative solution is that 432 tooth slots are arranged along a whole circumference, a corresponding standard included angle of β is equal to 360 degrees/432=0.833 degrees.

In the embodiment of the present application, the overall dimension of the iron core module conforms to the principle that the number q of slot per pole per phase is one, here the overall dimension refers to the overall size, arc length and the like of the iron core module, and the dimensions of some tooth slots and teeth are adjusted with reference to the above standard included angle β. For each iron core module, it is necessary to maintain the overall arc length according to the standard design, i.e., the sum of the standard included angles β according to the standard design. For example, referring to the structure in FIG. 1, the entire iron core includes 36 iron core modules, for each iron core module, it is necessary to maintain a radian of 12 β, that is, the overall radian of the iron core module is constant no matter how the number of tooth slots or the structure of the tooth slots is adjusted. For another example, if the entire iron core includes 18 iron core modules, it is necessary to maintain a radian of 24β for each iron core module.

In the embodiment of the present application, the dimension and the arrangement of the tooth slots are improved on the basis of standard design. As a preferred structure, a first included angle between center lines of teeth on the left side and the right side of the first tooth slot 41 which is not located at an end may set to be equal to the standard included angle, and a second included angle between center lines of teeth on the left side and the right side of the second tooth slot 42 may set to be equal to 1.5 times of the standard included angle, and the sum of third included angles corresponding to the first tooth slots 41 (i.e., the first tooth slots located on the left side and the right side in FIG. 1) at two ends may be set to be 2.5 times of the standard included angle. The third included angle refers to an included angle between a center line of a tooth on a side, close to the middle of the iron core module, of the first tooth slot 41 located at an end, and a side edge of the iron core module. The angle set for each part is for making the overall dimension of the iron core module to conform to the principle that the number q of slots per pole per phase is one, and angles of the iron core modules occupied in the entire circumference are the same. In the embodiment, the entire iron core modules maintain a radian of 12β by adjusting the widths of the teeth on the left side and the right side. Specifically, two or only one of the teeth at two ends may be adjusted. For example, in FIG. 1, the tooth at an end on the right side is widened (even if the third included angle corresponding to the first tooth slot 41 at the end of the right side is set to be 1.5 times of β) to compensate for a width due to the absence of one tooth slot. Alternatively, the widths of the teeth at two ends may be adjusted to compensate for a width due to the absence of one tooth slot.

Further, the number of the tooth slots and the number of the coils in the iron core module are not limited to the configuration shown in FIG. 1, and a stator module having larger numbers of tooth slots and coils may be configured according to the above-mentioned principle. From the perspective of composing the entire stator iron core, the number of tooth slots in the iron core module conform to the following principle: the number of the tooth slots contained in the iron core module is 6n-1, the number of coils in each of the three-phase winding units is 3n/2, the number of coils in the entire iron core module is 3n. A value of n is selected from 2, 4, 6, 8, 10, 12, 14, 16, 18. Specifically, the number of tooth slots in the iron core module (numbers in parentheses are the numbers of tooth slots of the iron core module having the tooth slots arranged uniformly designed according to the standard principle that the number q of slots per pole per phase is equal to 1, which is also β required for each iron core module) can be: 11 (12), 23 (24), 35 (36), 47 (48), 71 (72) and 107 (108), and the split number of the iron core modules can be obtained by dividing the number of tooth slots in parentheses by 432, that is, the number of respective splits are 36, 18, 12, 9, 6, 4.

Second Embodiment

This embodiment relates to a stator iron core including the iron core module according to the above embodiment and a wind power generator including the iron core.

Figure 4:
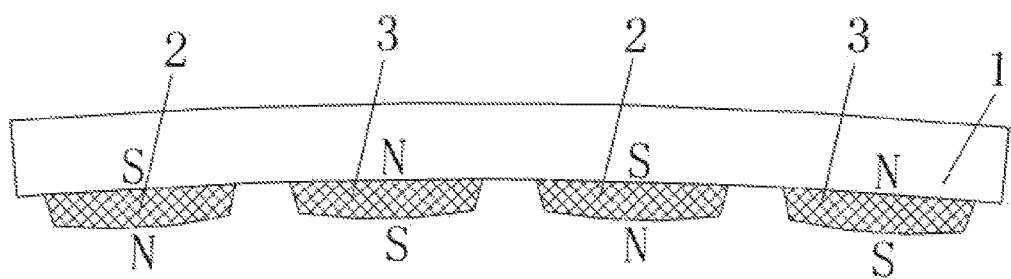
FIG. 4 is a first schematic view showing the structure of a magnetic pole of a rotor according to the second embodiment of the present application.

The stator iron core according to the embodiment of the present application is formed by assembling a certain number of the above iron core modules. Specifically, corresponding to the number of the tooth slots of the above iron core module, the number of iron core modules constituting the entire iron core may be 36, 18, 12 or 9 on the premise of adopting a design scheme that 432 tooth slots are arranged along the whole circumference. As shown in FIG. 4, which is a first schematic view showing the structure of a magnetic pole of a rotor according to an embodiment of the present application, and the entire stator iron core includes 36 iron core modules 4 as shown in FIG. 1.

A wind power generator according to an embodiment of the present application is formed by assembling the rotor and the stator which includes the above stator iron core. Corresponding to the above stator iron core, the rotor can adopt the following structure.

Figure 5:
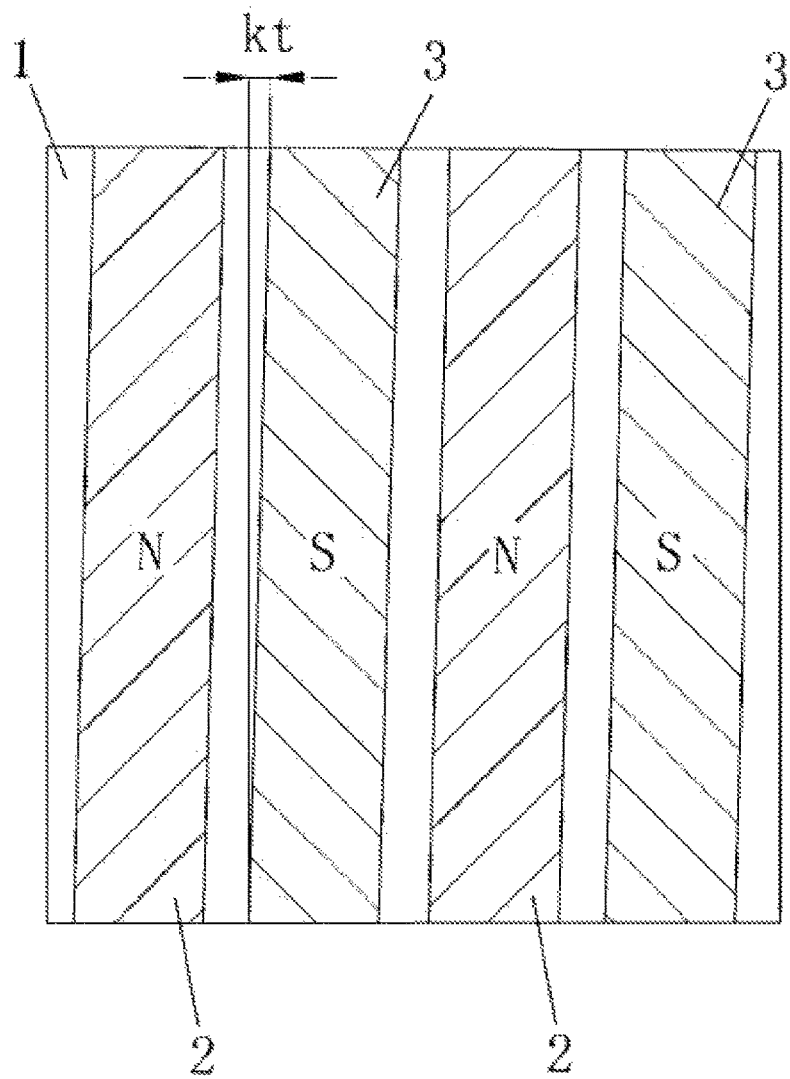
FIG. 5 is a second schematic view showing the structure of the magnetic pole of the rotor according to the second embodiment of the present application.

As shown in FIG. 4, the embodiment of the present application is illustrated by taking an outer rotor as an example, four magnetic poles are shown in FIG. 4, a magnetic pole 2 and a magnetic pole 3 have the opposite polarities and are spaced apart from each other. The total number of magnetic poles in the rotor can be 144 (the total number of magnetic poles in the rotor is equal to 432/(m*q)=432/(1*3)=144, wherein m is the number of phases) corresponding to the above design scheme of 432 tooth slots (the tooth slot designed according to the principle that the number q of slots per pole per phase is one). And the rotor can also be in a split structure, that is, the rotor is obtained by combining multiple rotor modules. A magnetic pole provided on a rotor support 1 can be an oblique magnetic pole. Further, as shown in FIG. 5, which is a second schematic view showing the structure of the magnetic pole of the rotor according to the embodiment of the present application, in a cross section (i.e., a cross section shown in FIG. 5) of the oblique magnetic pole parallel to an axis of the wind power generator, an angle kt corresponding to an arc length staggered between an upper side and a lower side of the oblique magnetic pole can be the above standard included angle, and the standard included angle can be 0.833 degrees corresponding to the above embodiment.

Figure 6:
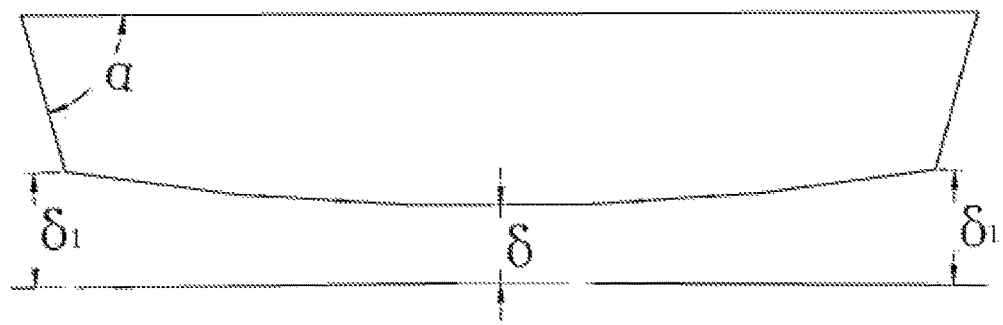
FIG. 6 is a third schematic view showing the structure of the magnetic pole of the rotor according to the second embodiment of the present application.

Preferably, the magnetic pole is a surface-mounted magnetic pole, and an axial sectional shape of the magnetic pole enables a non-uniform air gap to be formed between each magnetic pole and an outer circumference of the stator iron core. For example, as shown in FIG. 4 and FIG. 6, in a section of the magnetic pole perpendicular to an axis of the wind power generator (i.e., a section shown in FIG. 6), an edge of the magnetic pole on a side towards the stator is in an arc shape, and a ratio of a maximum air gap to a minimum air gap formed between the edge of the magnetic pole and the outer circumference of the stator iron core is allowed to be 1.5:1 by setting the size of the arc, that is, a ratio of an air gap $\delta_1$ at each of two ends of the magnetic pole to an air gap $\delta$ in the middle in FIG. 6 is 1.5:1, so that magnetic field distribution in the air gap is close to sinuousness. Further, as shown in FIG. 6, an included angle α between a bottom edge of the magnetic pole close to the rotor support 1 and a side edge of the magnetic pole preferably ranges from 70 degrees to 75 degrees in the cross section (i.e., the cross section shown in FIG. 6) of the magnetic pole perpendicular to the axis of the wind power generator.

The above structure of the magnetic pole of the rotor can better cooperate with arrangement manner of the tooth slots and the coils in the iron core module of the stator according to the above embodiment, thereby reducing the fifth and seventh harmonic magnetic fields.

In conclusion, the wind power generator according to the embodiments of the present application includes a rotor and a stator, the rotor includes a rotor support and a magnetic pole, and the stator includes an iron core and a single-layer winding. The tooth slots of an iron core module in the permanent magnet generator according to the embodiment is improved on the basis of the design principle that the number q of slots per pole per phase is one. Thus a design of a single-layer winding structure having double Y shifted by an electrical angle of 30 degrees (i.e., a phase difference between the two three-phase winding units in start connection is 30 degrees) is realized by changing a mechanical angle of the tooth slot and the number of the tooth slots, thereby effectively reducing the fifth and seventh winding harmonic magnetomotive forces without increasing the main dimension and manufacturing cost of the coil, and further realizing the purpose of a splitting design for the stator. Since a rotor permanent magnet in the present application has a high utilization rate, a magnetic leakage factor of the permanent magnet can be reduced, a magnetic field of the air gap has good sinuousness, and tooth slot torque can be reduced effectively. Torque ripple of the generator under no load and load can be reduced, and back electromotive force wave under no load can be improved, thereby reducing the vibration and noise of the generator, prolonging the service life of the generator and improving the reliability of the generator. It should be noted that the solution of the embodiment of the present application is not limited to the design of the inner stator and outer rotor type, but may be a design of the inner rotor and outer stator type.

The embodiments described hereinabove are only preferred embodiments of the present application, and should not be interpreted as limitation to the protection scope of the present application. Any modifications and replacements easily conceived by those skilled in the art within the technical scope of the present application are also deemed to fall into the scope of the present application defined by the claims.

The invention claimed is:

1. An iron core module of a stator of a wind power generator, wherein an overall dimension of the iron core module conforms to a principle that the number q of slots per pole per phase is one, two three-phase winding units are arranged in the iron core module, and an electrical angle difference between the two three-phase winding units is 30 degrees: and wherein the iron core module comprises a plurality of tooth slots for accommodating coils, each of the coils is sleeved in two of the plurality of tooth slots, the plurality of tooth slots comprise first tooth slots each being configured to accommodate one coil side and a second tooth slot configured to accommodate two coil sides;

the number of the second tooth slot is one, the second tooth slot is arranged in a middle position of the plurality of tooth slots, and the number of the first tooth slots on a left side of the second tooth slot is equal to the number of the first tooth slots on a right side of the second tooth slot;

two three-phase winding units having the same number of coils are arranged in the iron core module, the number of coils in each of the two three-phase winding units is an integer multiple of 3; and the two three-phase winding units are arranged on the left side and the right side of the second tooth slot as a center, respectively, and the adjacent coils of the two three-phase winding units each have one coil side arranged in the second tooth slot.

2. The iron core module according to claim 1, wherein a first included angle between center lines of teeth on the left side and the right side of the first tooth slot which is not located at an end is equal to a standard included angle;

a second included angle between center lines of teeth on the left side and the right side of the second tooth slot is equal to 1.5 times of the standard included angle;

the sum of third included angles corresponding to the first tooth slots at two ends is 2.5 times of the standard included angle, each of the third included angles is an angle between a side edge of the iron core module and a center line of a tooth on a side of the first tooth slot at one end, which side is close to the middle of the iron core module; and the standard included angle is an included angle between center lines of adjacent teeth of the iron core module having uniformly arranged tooth slots and designed according to the principle that the number q of slots per pole per phase is one.

3. The iron core module according to claim 2, wherein the standard included angle is 0.833 degrees.

4. The iron core module according to claim 1, wherein the wire connection of a winding in each of the two three-phase winding units is star connection.

5. The iron core module according to claim 1, wherein the number of the plurality of tooth slots contained in the iron core module is 6n-1, the number of coils in each of the two three-phase winding units is 3n/2, where a value of n is selected from 2, 4, 6, 8, 10, 12, 14, 16, 18.

6. A stator iron core for a wind power generator, wherein the stator iron core has a split structure, and is formed by combining a plurality of the iron core modules according to claim 1.

7. A wind power generator, comprising a rotor and a stator which comprises the stator iron core according to claim 6.

8. The wind power generator according to claim 7, wherein the rotor has a split structure and is formed by combining a plurality of rotor modules.

9. The wind power generator according to claim 7, wherein a magnetic pole of the rotor is an oblique magnetic pole.

10. The wind power generator according to claim 9, wherein in a cross section of the oblique magnetic pole parallel to an axis of the wind power generator, an angle corresponding to an arc length staggered between an upper side and a lower side of the oblique magnetic pole is a standard included angle, and the standard included angle is an included angle between center lines of adjacent teeth of the iron core module having uniformly arranged tooth slots and designed according to the principle that the number q of slots per pole per phase is one.

11. The wind power generator according to claim 10, wherein the standard included angle is 0.833 degrees.

12. The wind power generator according to claim 11, wherein the magnetic pole of the rotor is a surface-mounted magnetic pole, and an axial sectional shape of the magnetic pole allows a non-uniform air gap to be formed between the magnetic pole and an outer circumference of the stator iron core.

13. The wind power generator according to claim 12, wherein in a cross section of the magnetic pole perpendicular to the axis of the wind power generator, an edge of the magnetic pole on a side towards the stator is arc shaped, and a ratio of a maximum air gap to a minimum air gap formed between the edge of the magnetic pole and the outer circumference of the stator iron core is 1.5:1.

14. The wind power generator according to claim 13, wherein in the cross section of the magnetic pole perpendicular to the axis of the wind power generator, an included angle between a bottom edge of the magnetic pole close to a rotor support and a side edge of the magnetic pole ranges from 70 degrees to 75 degrees.

15. The iron core module according to claim 2, wherein the number of the plurality of tooth slots contained in the iron core module is 6n-1, the number of coils in each of the two three-phase winding units is 3n/2, where a value of n is selected from 2, 4, 6, 8, 10, 12, 14, 16, 18.

16. The iron core module according to claim 3, wherein the number of the plurality of tooth slots contained in the iron core module is 6n-1, the number of coils in each of the two three-phase winding units is 3n/2, where a value of n is selected from 2, 4, 6, 8, 10, 12, 14, 16, 18.

17. The iron core module according to claim 4, wherein the number of the plurality of tooth slots contained in the iron core module is 6n-1, the number of coils in each of the two three-phase winding units is 3n/2, where a value of n is selected from 2, 4, 6, 8, 10, 12, 14, 16, 18.

* * * * *